United States Patent
Kurtz

(10) Patent No.: US 7,743,662 B2
(45) Date of Patent: Jun. 29, 2010

(54) LOW DIFFERENTIAL PRESSURE TRANSDUCER

(75) Inventor: Anthony D. Kurtz, Saddle River, NJ (US)

(73) Assignee: Kulite Semiconductor Products, Inc., Leonia, NJ (US)

( * ) Notice: Subject to any disclaimer, the term of this patent is extended or adjusted under 35 U.S.C. 154(b) by 0 days.

(21) Appl. No.: 12/070,255

(22) Filed: Feb. 14, 2008

(65) Prior Publication Data
US 2009/0205433 A1    Aug. 20, 2009

(51) Int. Cl.
*G01L 9/06* (2006.01)
(52) U.S. Cl. .................. 73/721; 73/716; 361/283.1
(58) Field of Classification Search ........... 73/700–756; 361/283.1–283.4
See application file for complete search history.

(56) References Cited

U.S. PATENT DOCUMENTS

| | | | | | |
|---|---|---|---|---|---|
| 3,739,315 | A | * | 6/1973 | Kurtz et al. | 338/3 |
| 4,133,100 | A | * | 1/1979 | Myhre | 29/621.1 |
| 4,222,277 | A | * | 9/1980 | Kurtz et al. | 73/721 |
| 4,370,890 | A | * | 2/1983 | Frick | 73/718 |
| 4,376,929 | A | * | 3/1983 | Myhre | 338/4 |
| 6,330,829 | B1 | * | 12/2001 | Kurtz et al. | 73/717 |
| 6,543,291 | B1 | * | 4/2003 | Kurtz et al. | 73/716 |
| 6,595,066 | B1 | | 7/2003 | Kurtz et al. | |
| 6,813,953 | B2 | * | 11/2004 | Baba et al. | 73/715 |

* cited by examiner

*Primary Examiner*—Lisa M Caputo
*Assistant Examiner*—Jermaine Jenkins
(74) *Attorney, Agent, or Firm*—Troutman Sanders LLP; James E. Schutz; Jihan A. R. Jenkins

(57) ABSTRACT

A pressure transducer has an H-shaped header having a front and a back section. The front and back sections are of equal diameter and are circular. Each front and back section has a depression with a diaphragm covering the depression. Each diaphragm is of equal size and the depressions communicate one with the other via a central channel in the central arm of the H. A pressure sensor communicates with the channel, where the pressure sensor responds to a first pressure applied to the first diaphragm and a second pressure applied to the second diaphragm. The pressure sensor produces an output equal to the difference in pressure. The differential pressure inducer having both diaphragms of the same size and still enabling leads from the sensor to be brought out.

10 Claims, 2 Drawing Sheets

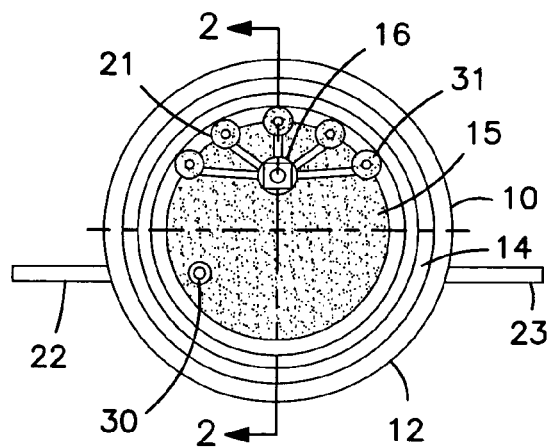
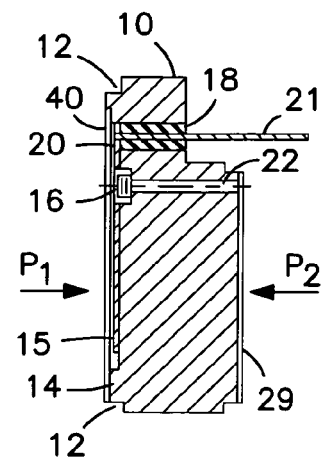
FIG. 1
PRIOR ART
FIG. 2
PRIOR ART
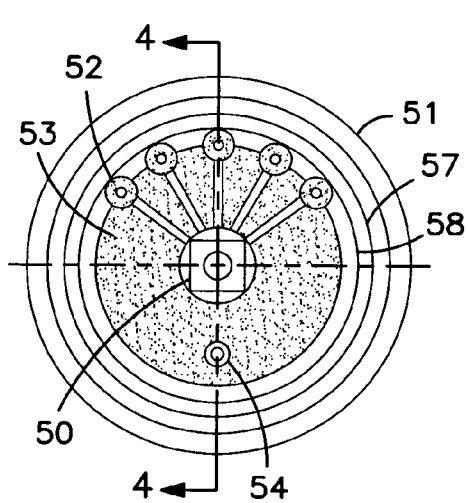
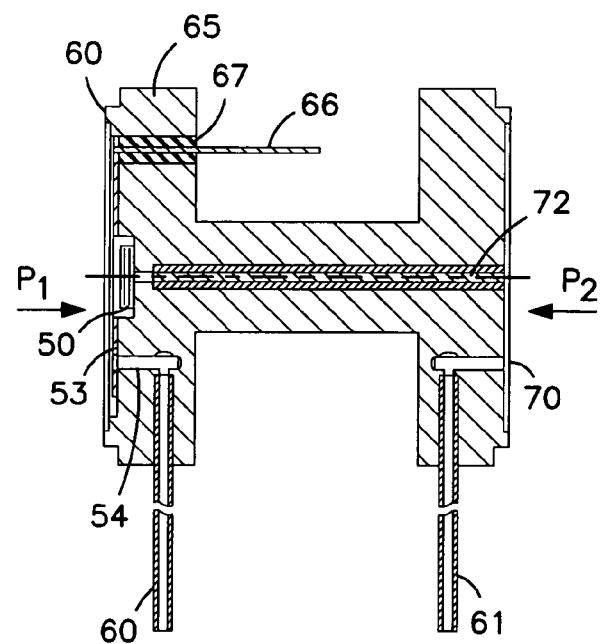
FIG. 3
FIG. 4

LOW DIFFERENTIAL PRESSURE TRANSDUCER

FIELD OF THE INVENTION

This invention relates to pressure transducers and more particularly to a low differential pressure transducer and header.

BACKGROUND OF THE INVENTION

A differential pressure transducer is a device which provides an output which is the difference between two input pressures. For example, when a Pressure $P_1$ is applied to one face of a deflecting diaphragm and a pressure $P_2$ is applied to the other face of the deflecting diaphragm the resulting deflection will be determined by the difference in pressure (as for example $P_1$-$P_2$). There are other differential pressure transducers which essentially use two separate semiconductor structures each structure having its own diaphragm and the piezoresistor devices which are employed on the diaphragm surface are connected together to form a bridge which will provide a differential output. Reference is made to U.S. Pat. No. 6,595,066 entitled Stopped Leadless Differential Sensor issued on Jul. 22, 2003 to AD Kurtz, et. al. and assigned to the assignee herein. That patent shows a differential transducer where the pressure is applied to the top face or the top side of the diaphragm and to the bottom face or bottom side of the diaphragm to obtain a differential output. The patent shows a Wheatstone Bridge array consisting of piezoresistors which vary resistance according to the magnitude of a pressure or force applied to the diaphragm.

However, in prior art devices which utilize a force applied to two separate diaphragms, there is a problem in low pressure devices to bring out the leads. This problem resulting in one of the diaphragms of the differential transducer being smaller than the other diaphragm. In any event, it is known that the diaphragm size effects the operation of such a device. The larger the diaphragm, the less the back pressure, and the larger the diaphragm, the more compliant the diaphragm is. Therefore a large diaphragm is more compliant and will experience less back pressure than a smaller diameter diaphragm. Thus the prior art devices because of the problem in bringing out the leads as will be further explained had and required two different size diaphragms, one diaphragm being larger in diameter than the other diaphragm thus, resulting in pressure variations which compromised the operation of such devices.

Therefore, is an intention of the present invention to provide a low pressure differential transducer having the same size diaphragm while enabling one to bring out the leads from the semiconductor sensor in a simple and expeditious manner.

SUMMARY OF THE INVENTION

A pressure transducer, comprising: A header having a front section and a back section, each section having an outer surface, a central section joining said front and back sections to form an "H" shaped header, said front section outer surface having a first depression of a given area, a first flexible diaphragm covering said first depression, said back section outer surface having a second depression of said given area, a second flexible diaphragm covering said second depression where said first and second diaphragms are relatively of the same size and area, a channel positioned within said central section and extending and communicating with said first and second depressions, a sensor having a sensor diaphragm communicating with said channel with said sensor diaphragm located to receive on one side a pressure applied to said first diaphragm and to receive on said other side a pressure applied to said second diaphragm wherein said sensor diaphragm deflects in accordance with the difference in pressure applied to said sides.

BRIEF DESCRIPTION OF THE FIGURES

FIG. 1 is a top plan view showing a prior art low pressure differential transducer.

FIG. 2 is the prior art device of FIG. 1 taking through line 2-2 of FIG. 1.

FIG. 3 is a top plan view of a transducer according to the present invention.

FIG. 4 is a cross-sectional view of the low pressure differential transducer according to this invention taking through line 4-4 of FIG. 3.

DETAILED DESCRIPTION OF THE FIGURES

Figure 5:
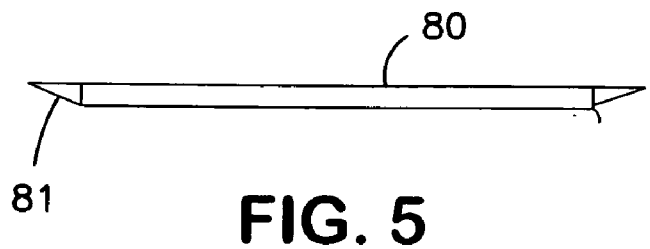
FIG. 5 is a cross-sectional view of a diaphragm according to this invention.

Referring to FIGS. 1 and 2 there is shown a prior art low pressure differential pressure transducer. Essentially, the pressure transducer basically consists of a metal housing 10 which has a outer peripheral indented flange 12 and a series of concentric rims or flanges as 14 and so on. The flanges are to accommodate a diaphragm 15 which is shown in FIG. 2. The diaphragm is not shown in FIG. 1 in order to clarify the presentation. As seen in FIG. 1 there is a first and second oil fill tube as 22 and 23. Essentially the transducer 10 is a differential transducer and is seen in FIG. 2 has a diaphragm in the front 20 and a diaphragm in the back 29. The device operates such that when a pressure $P_1$ is applied to the front of the diaphragm 20 while pressure $P_2$ is applied to the back of the diaphragm 29. The transducer has a sensor module 16. The module 16 is an oil filled unit having a piezoresistive Wheatstone Bridge array. When a pressure $P_1$ is applied to diaphragm 20 and a pressure $P_2$ is applied to diaphragm 29, the pressure $P_2$ is transmitted via channel 22, which is oil filled to the bottom of sensor module 16 while $P_1$ is applied to the top of the module 16. The bridge produces an output proportional to the difference in pressure $P_1$-$P_2$. It is of course understood that FIG. 1 does not show the diaphragm but FIG. 2 shows both the top and bottom diaphragms 20 and 29. The entire device is oil filled and the pressure $P_1$ is applied to diaphragm 20 and a pressure $P_2$ is applied to diaphragm 20. There is a ceramic layer and 15 which basically covers the central area of the transducer as shown in FIG. 1. Between the ceramic layer 15 and diaphragm 20 there is a spacing which is oil filled. When a force $P_1$ is applied to diaphragm 20, the sensor 16 will respond as the force is transmitted through the oil. On the low side, or other side, there is the diaphragm 29 which is also associated with an oil filled cavity and oil filled channel 22 which communicates with the bottom side of the sensor diaphragm and therefore when a pressure $P_2$ is applied to diaphragm 29, the pressure is transmitted via the oil in channel 22 to the underside of the diaphragm associated with the sensor module 16. In this manner, the sensor, which is a semiconductor device, will produce an output proportional to the difference of $P_1$ and $P_2$, namely the differential pressure.

As shown in FIG. 1 and FIG. 2 the sensor module 16 is associated with wires or output leads for example as 21 and 31. In any event, these output leads must be brought out from the device as shown in FIG. 2, and hence the output lead 21 which is coupled to the header by a glass to metal seal 18 is directed through the header 10 at the top area 40. The area 40 is thinner than or a different size than the remaining portion of the header. Because of the need to bring out the leads as 21 and other leads, one has to make the diaphragm 29 smaller than the diaphragm 20. In this manner as indicated the diaphragm 29 is not as efficient as the diaphragm 20. The larger the diaphragm the less the back pressure and the larger the diaphragm the more compliant the diaphragm is. In any event, in the prior art the diaphragms are of different sizes whereby the diaphragm 29 associated with pressure $P_2$ is smaller than the diaphragm 20 associated with pressure $P_1$. This is necessary to allow the pins such as 21 to clear and to be brought out. It is understood that if the pins were brought out in any other manner they would have to go through or somehow avoid the diaphragm 29 making it a difficult problem.

Referring to FIG. 3 there is shown top plan view of a low pressure differential transducer according to this invention. Essentially the top plan view of FIG. 3 looks similar to the top plan view of FIG. 1. The sensor 50 is located at the center but can be positioned as the sensor 16 of FIG. 1. The sensor 50 is associated with leads such as 52 which are wire-bonded leads which have to again be brought out. There is shown a ceramic disc 53 having a central aperture surrounding the sensor module 50. The sensor 50 responds to pressure when a pressure is applied to the diaphragm. The spacing between the backside of the diaphragm and the ceramic is oil-filled and as shown in FIG. 4, the device has two oil-filled tubes as 60 and 61 where oil flows through the tubes into the spacing between the ceramic layer 53 and the front diaphragm 60 and into the space adjacent diaphragm 70 into channel 72. The header 65 is H-shaped and in this manner the leads which, are for example, lead 66 are positioned in the housing by means of a glass to metal seal 67. Due to the H-shaped header, leads such as 66 can be brought out while the isolation diaphragm on the low side which is diaphragm 70 is of the same size and diameter as diaphragm 60 in FIG. 4. There is also the channel 72 which is oil-filled and which communicates with the backside of the sensing chip 50 to enable the pressure $P_2$ to be directed to the backside while pressure $P_1$ is directed to the frontside and therefore the sensor module provides an output proportional to the difference between pressures $P_1$ and $P_2$.

As one can see the device of FIG. 4 enables the leads to be brought out as in the prior art but enables the diaphragm as 70 and 60 to be of the same size and same diameter. This results in a more uniform operation of the device due to the fact that both diaphragms have the same back pressure and are similarly compliant.

Referring to FIG. 5 there is shown a cross-sectional view of a typical diaphragm 80 which is the type of diaphragm employed in FIG. 4 as diaphragm 60 and 70 as well the diaphragm shown in FIG. 2 as diaphragms 20 and 29. As seen, the diaphragm 80 is basically thin and made of metal and has a peripheral flange 81 whereby the diaphragm is positioned as shown in FIGS. 3 and 4 between the ridges as for example 57 and 58.

Figure 6:
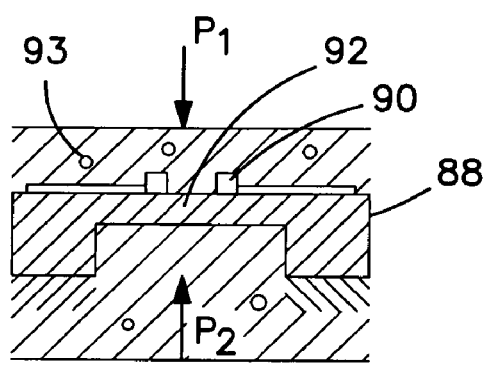
FIG. 6 is a cross-sectional view of a pressure sensor employing piezoresistors according to this invention.

Referring to FIG. 6 there is shown a schematic cross-sectional view of a typical sensor module. The sensor module 88 contains a semiconductor substrate 88 having a thin active area or diaphragm 92 upon which piezoresistors such as 90 are positioned. The sensor can be protected by coating it with a layer of silicon dioxide and essentially the pressure $P_1$ is applied to the top of the sensor active area or diaphragm 92. The pressure is transmitted to the sensor by the oil 93 which fills the cavity above the sensor as for example, shown in FIGS. 2 and 4. The sensor has the underside of the diaphragm 92 subjected to pressure $P_2$ via channel 72 and therefore, as indicated, produces an output pressure $P_1$-$P_2$ or the differential pressure.

Figure 7:
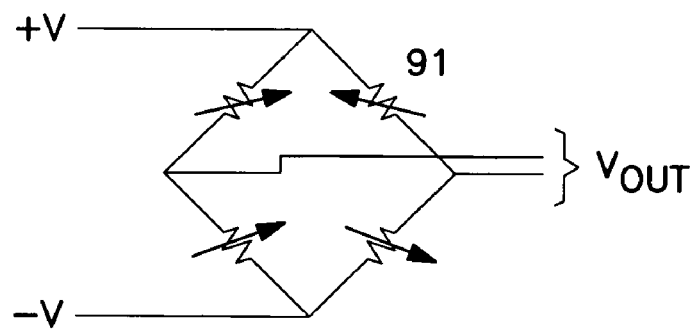
FIG. 7 is a schematic diaphragm of Wheatstone Bridge such as the type employed on the sensor of FIG. 6 and used in explaining this invention.

Shown in FIG. 7 is a Wheatstone Bridge configuration which is a typical sensor structure and the Wheatstone Bridge, for example, has four resistors, which can be piezoresistors as resistors 90 shown in FIG. 6. The resistors change resistance according to an applied pressure. As seen there are four leads associated with the bridge which are two for biasing the bridge and two providing an output. In any event, normally five leads are used as one lead can be a separate ground reference lead, as for example shown in FIG. 1 and FIG. 2. These leads, as seen, have to be directed out from the device. Essentially, as seen above, there is a shown a low pressure differential transducer which enables one to bring leads out while having the ability to have first and second diaphragms of equal diameter and equal size therefore to enable the diaphragms to exhibit the same back pressure and being equally compliant. This results in improved operation as compared to prior art devices.

It should be apparent to one skilled in the state of the art that there are many alternate embodiments which can be determined or are which are deemed to be encompassed within the spirit and the claims appended hereto.

I claim:

1. A pressure transducer, comprising:
   a header having a first disk of a first diameter, a second disk of a second diameter, and a central cylinder of a third diameter,
   wherein said first disk has a front side and a back side, wherein the front side of the first disk has a first depression of a given area and a first flexible diaphragm covering said first depression, wherein said first diaphragm is to receive a first pressure,
   wherein said second disk has a front side and a back side, wherein the front side of the second disk has a second depression of said given area and a second flexible diaphragm covering said second depression, wherein said second diaphragm is to receive a second pressure,
   wherein the central cylinder connects the back side of the first disk and the back side of the second disk and wherein the third diameter is smaller than the first diameter such that portions of the back side of the first disk can be accessed adjacent the central cylinder,
   a channel positioned within said central cylinder that extends between said first and second depressions, and
   a sensor having a sensing diaphragm positioned in said channel wherein the sensing diaphragm communicates with said first diaphragm and said second diaphragm and wherein said sensing diaphragm deflects in accordance with the difference in said first pressure and said second pressure.

2. The pressure transducer according to claim 1 wherein said header is fabricated from a metal.

3. The pressure transducer according to claim 1 wherein said first and second diaphragms are fabricated from a metal.

4. The pressure transducer according to claim 1 further including a pressure transmitting fluid filling said channel and said depression to allow pressure to be applied to said sensor via said fluid.

5. The pressure transducer according to claim 4 wherein said fluid is oil.

6. The pressure transducer according to claim 1 wherein said sensor is a semiconductor sensor having a diaphragm area which deflects upon application of a force thereto.

7. The pressure transducer according to claim 1 wherein said sensor has a Wheatstone Bridge including at least one piezoresistor located thereon.

8. The pressure transducer according to claim 1 wherein the first diaphragm and second diaphragm are substantially axially aligned.

9. The pressure transducer according to claim 1 wherein one or more electrical leads are connected to the back side of the first disk.

10. The pressure transducer according to claim 9 wherein the leads from said sensor are directed to pins in one arm of said front disk.

* * * * *